UNITED STATES PATENT OFFICE.

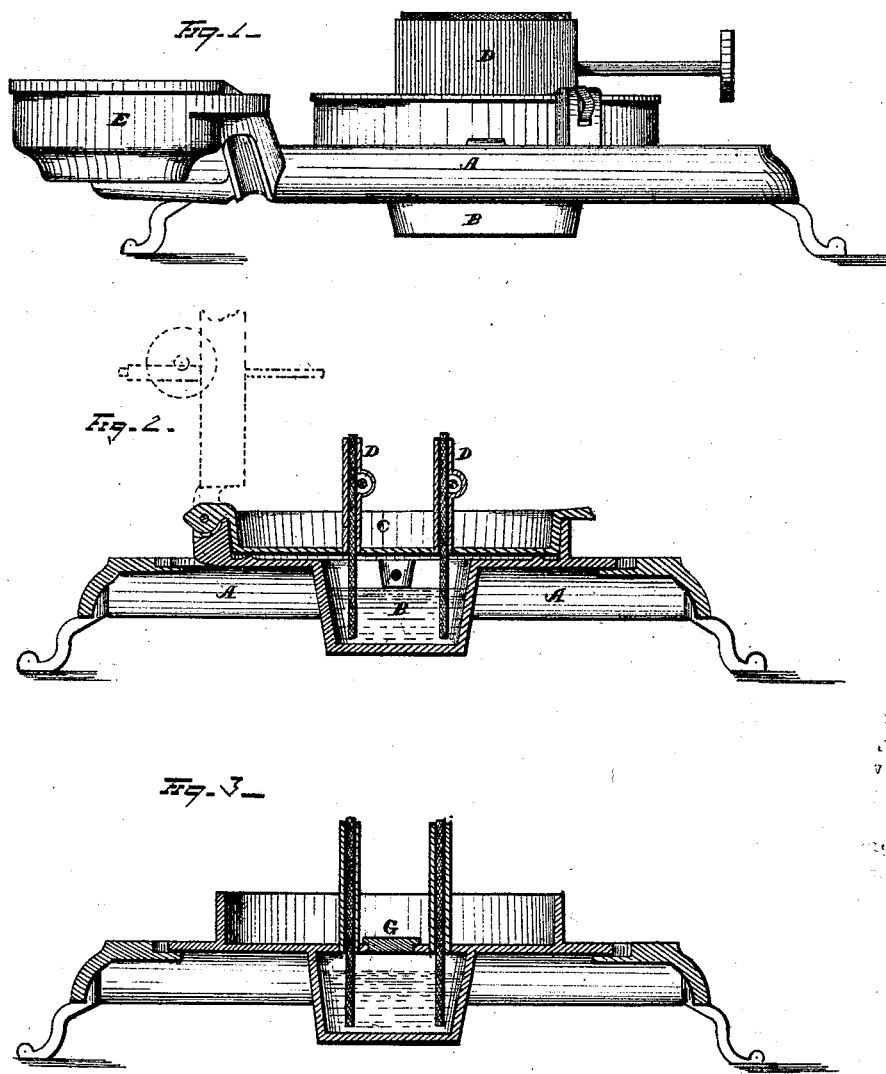

JOHN McCONNELL, OF CLEVELAND, OHIO.

IMPROVEMENT IN OIL-STOVES.

Specification forming part of Letters Patent No. 180,486, dated August 1, 1876; application filed May 3, 1876.

*To all whom it may concern:*

Be it known that I, JOHN MCCONNELL, of Cleveland, in the county of Cuyahoga and State of Ohio, have invented certain new and useful Improvements in Portable and Oil Stoves; and I do hereby declare the following to be a full, clear, and exact description of the invention, such as will enable others skilled in the art to which it pertains to make and use it, reference being had to the accompanying drawings, which form part of this specification.

My invention relates to an improvement in stoves intended for using oil as fuel.

In the drawings, Figure 1 is an isometric view of a stove according to my invention, and Fig. 2 is a view in cross-section of the same, the dotted lines showing the feature of the removable or hinged lid-top or pan that holds the burners.

My invention consists in the following parts and combinations, as hereinafter specified and claimed, wherein—

A is a suitable frame, of metal or wood, for holding and supporting the oil-reservoir B, hinged or removable top C, burners D, and box E, whereby the entire device may be made portable.

If desired, the frame A may be made sufficiently large to accommodate two or more burners and attachments.

The oil-reservoir B is placed directly beneath the burners D. The burners D are fixed upon the lid C. This lid is made in the form of a pan or dish, and may contain water, glycerine, or the like, whereby the oil beneath may be kept cool. The lid or pan C is also galvanized, which lessens its heat-conducting qualities, and further prevents the oil in the reservoir becoming heated.

The lid C is made either hinged or removable, although I prefer making it hinged, so as always to secure the burners D in the proper position.

The advantage of making the lid C removable from the reservoir B is that the reservoir may thus be more readily filled, and the wicks of the burners D may be more easily managed.

The box E is intended to contain wicks, trimmers, and the tools necessary to use about the stove.

It will be noticed that I make the rim or edge of the lid or cover C to cover over and completely protect the upper edge of the oil-reservoir, so that no dirt, water, or foreign matter shall reach the oil. In the present instance, I have shown a flange upon the rim of the lid or cover C, that overlaps the top of the oil-reservoir.

If, by any chance, the oil in the reservoir should become heated to such an extent as to generate explosive gas or vapor, the same may readily escape, without danger, by either lifting the lid C, or escaping between the lid C and oil-reservoir without lifting said lid.

A great advantage gained by the hinged or removable lid is that the reservoir can not only be readily filled, but the wicks, should they drop into the reservoir, or get out of reach, or for any reason become inoperative, can be readily reached and corrected without damage or expense.

Fig. 3 of the drawings shows a modification of my invention, wherein, instead of the entire cover of the oil-reservoir being made removable, only a part of it is made so, by the provision of a cap, G, so located that, through the opening made by its removal, the reservoir can be replenished, and the wicks be reached from beneath, when necessary.

What I claim is—

1. In an oil-stove, the combination, with the oil-reservoir B, formed with an upper flange, of a hinged dish-shaped cover, C, carrying wick-tubes, the cover fitting within the flange of the oil-reservoir, substantially as and for the purpose described.

2. The combination, with an oil-reservoir provided with an annular rib on a flange projecting from its upper edge, of a hinged dish-shaped cover, substantially as and for the purpose set forth.

3. The combination, with a supporting-frame, of a removable oil-stove, the same consisting of an oil-reservoir formed with a dish-shaped top, and a dish-shaped cover carrying wick-tubes hinged thereto, substantially as and for the purpose set forth.

4. As a new article of manufacture, an oil-stove consisting of a supporting-frame having a tool-box connected therewith, and a removable oil-reservoir provided with a dish-shaped cover hinged thereto, substantially as and for the purpose specified.

In testimony whereof I have signed my name to this specification in the presence of two subscribing witnesses.

JOHN McCONNELL.

Witnesses:
L. L. LEGGETT,
FRANCIS TOUMEY.